United States Patent
Liem et al.

(10) Patent No.: US 10,990,854 B2
(45) Date of Patent: Apr. 27, 2021

(54) METHOD FOR QUICK ESTIMATION OF A PERSPECTIVAL OCCLUSION IN A SIMULATION OF AN IMAGING SENSOR

(71) Applicant: dSPACE digital signal processing and control engineering GmbH, Paderborn (DE)

(72) Inventors: Kusnadi Liem, Paderborn (DE); Michael Peperhowe, Paderborn (DE)

(73) Assignee: DSPACE DIGITAL SIGNAL PROCESSING AND CONTROL ENGINEERING GMBH, Paderborn (DE)

( * ) Notice: Subject to any disclaimer, the term of this patent is extended or adjusted under 35 U.S.C. 154(b) by 0 days.

(21) Appl. No.: 16/383,696

(22) Filed: Apr. 15, 2019

(65) Prior Publication Data

US 2019/0347525 A1 Nov. 14, 2019

(30) Foreign Application Priority Data

May 14, 2018 (EP) .................................... 18172050

(51) Int. Cl.
*G06K 9/62* (2006.01)
*G06K 9/00* (2006.01)
(Continued)

(52) U.S. Cl.
CPC ....... *G06K 9/6265* (2013.01); *G06K 9/00791* (2013.01); *G06K 9/20* (2013.01); *G06K 9/4604* (2013.01)

(58) Field of Classification Search
CPC .... G06K 9/6265; G06K 9/00791; G06K 9/20; G06K 9/4604; G06F 9/455
See application file for complete search history.

(56) References Cited

U.S. PATENT DOCUMENTS 9,575,161 B1 * 2/2017 Haghighi .............. G01S 7/4056
10,635,844 B1 4/2020 Roose et al.
(Continued)

FOREIGN PATENT DOCUMENTS

EP 0620409 A2 10/1994
GB 2451615 A 2/2009

OTHER PUBLICATIONS

IP.com search report.*
(Continued)

*Primary Examiner* — Asghar H Bilgrami
(74) *Attorney, Agent, or Firm* — Leydig, Voit & Mayer, Ltd.

(57) ABSTRACT

A method for simulating a sensor system includes checking whether an intersection of the first image and the second image exists and assessing whether or not the second virtual object is perspectively occluded. In case an intersection exists, the Euclidean distance between the sensor and the first virtual object is smaller than the Euclidean distance between the sensor and the second virtual objects, and the size of the intersection exceeds a pre-defined threshold value, the second virtual object is assessed as perspectively occluded. In case an intersection does not exist, the Euclidean distance between the sensor and the first virtual object is not smaller than the Euclidean distance between the sensor and the second virtual objects, or the size of the intersection exceeds a pre-defined threshold value, the second virtual object is assessed as not perspectively occluded.

15 Claims, 7 Drawing Sheets

(51) Int. Cl.
*G06K 9/20* (2006.01)
*G06K 9/46* (2006.01)
*G06F 9/455* (2018.01)

(56) References Cited

U.S. PATENT DOCUMENTS

2016/0163048 A1* 6/2016 Yee ................... G06F 3/04845
 382/131
2017/0363719 A1* 12/2017 Ahmed ................ G01S 7/4052

OTHER PUBLICATIONS

Xue-Li, et al., "Fast Collision Detection Based on Projection Parallel Algorithm," *2nd International Conference on Future Computer and Communicat,* 1:179-182 (Dec. 2010).
Ericson, "Collisions Using Separating-Axis Tests," *Game Developers Conference* (Dec. 2007).
Anonymous, "Hidden Surface and Hidden Line Remove,": 1-6 (N/A).
Gotsman, et al., "Intro to Computer Graphics: Hidden Surface Removal,": 1-7 (N/A).
Lindemann, "The Gilbert-Johnson-Keerthi Distance Algorithm,": 1-4 (Dec. 2009).
Moeller, "Visibility and Hidden Surface Removal: Introduction to Computer Graphics," (N/A).
Anonymous, "2D Collision Detection in a 3D Orthographhic Game," (Dec. 8, 2013).

* cited by examiner

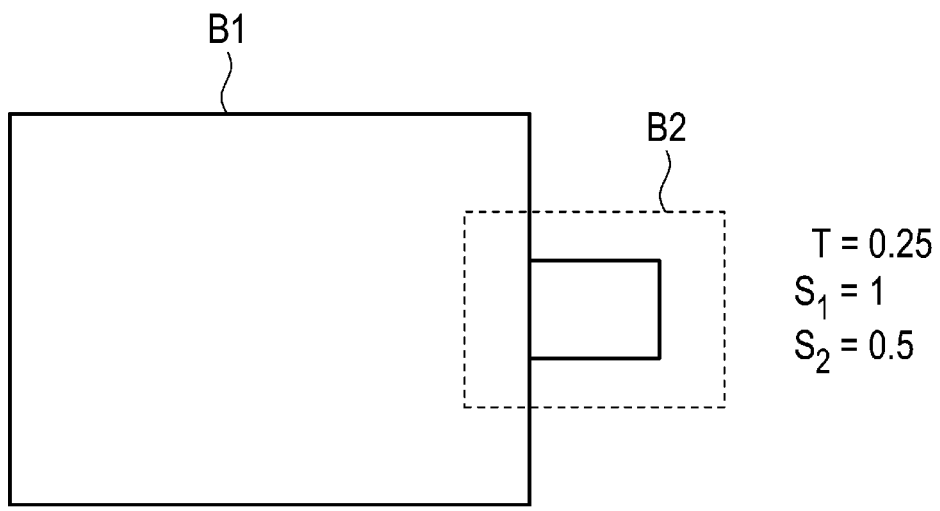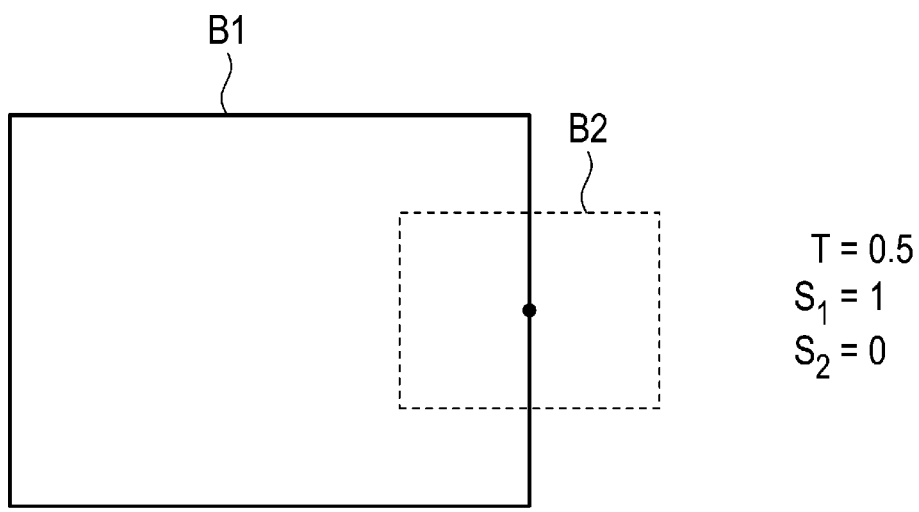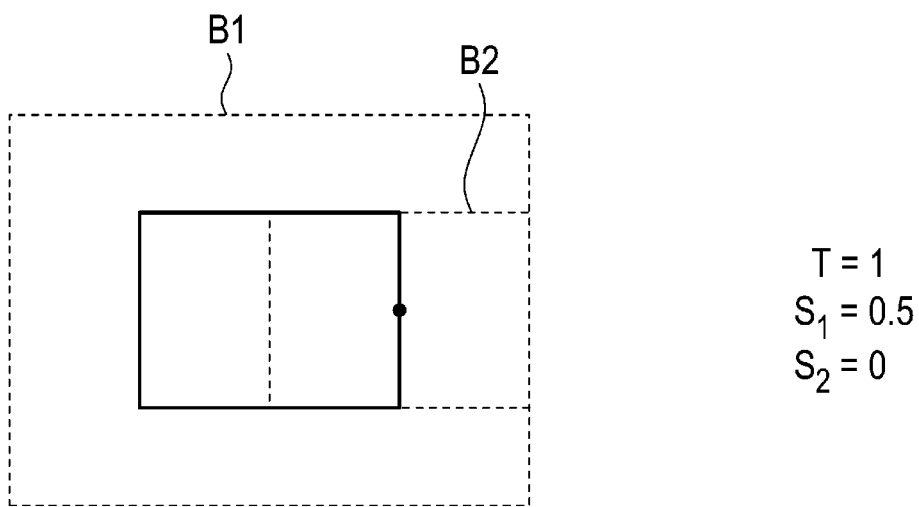
Fig. 7

METHOD FOR QUICK ESTIMATION OF A PERSPECTIVAL OCCLUSION IN A SIMULATION OF AN IMAGING SENSOR

CROSS-REFERENCE TO RELATED APPLICATIONS

Priority is claimed to European Patent Application No. EP 18172050.9, filed on May 14, 2018, the entire disclosure of which is hereby incorporated by reference herein.

FIELD

The invention relates to sensor simulation and virtual testing.

BACKGROUND

In the development of embedded systems critical to safety, it is conventional to investigate these systems for correct functioning in a virtual test environment. In a method known as Hardware in the Loop (HIL), a prototype of an embedded system is connected to a simulation computer, which provides a broadly virtual test environment and supplies the embedded system in strict real time with input data generated by the virtual test environment. The simulation computer can read control signals from the embedded system and include these when calculating the state of the virtual test environment in the next simulation time slot in each case. In earlier development stages, instead of a prototypical embedded system, integrating only its software or its program logic in a virtual test environment is also known. Such completely virtual test methods are known as Software in the Loop (SIL) or Model in the Loop (MIL) and do not necessarily have to run in real time. In the automobile industry, a method called Vehicle in the Loop (VIL) is also known, in which a prototype of the embedded system is tested in a physical test vehicle installed on a test track or a roller dynamometer, wherein the embedded system is supplied in strict real time with synthetic sensor data generated by a virtual test environment.

Some embedded systems analyze sensor data that is delivered by sensor systems with imaging sensors. Such embedded systems have particular significance in the automobile industry in connection with ADAS (Advanced Driving Assistance Systems) and highly-automated driving (HAD). "Imaging sensors" include sensors from whose sensor data an image of the sensor environment is reproducible—for example, RADAR (Radio Detection and Ranging), LIDAR (Light Detection and Ranging), and ultrasound sensors, as well as optical sensors of camera systems for passive image recording in the visible or invisible light spectrum. In addition to the sensor itself, such sensor systems can also incorporate an image-processing unit for analyzing the image data delivered by the sensor. The image-processing unit can be designed as an independent embedded system or integrated into the embedded system for testing.

If a virtual test environment for testing an embedded system which is expecting the input data from a sensor system with an imaging sensor is provided, the virtual test environment must incorporate a simulation of the sensor system. In some applications, e.g., if the image-processing unit is not a specimen or a part of the specimen, it is sensible to dispense with a detailed simulation of the sensor to save computing time. Instead of calculating the sensor image data from the virtual test environment, a sensor field of view is assigned to the simulated sensor, e.g., a conical field of view with a restricted range, starting from the sensor, and, from a multitude of virtual objects included by the virtual environment, a number of virtual objects are determined to be virtual objects detectable by the sensor. For example, if the sensor simulation is provided for simulation of traffic sign recognition, all virtual traffic signs available to the virtual test environment can be determined as virtual objects detectable by the sensor system. In one simulation run in the virtual test environment, in an exemplary application, all virtual traffic signs that are captured by the sensor field of view would then be recorded in an interim list of virtual objects, whereas all remaining virtual objects recorded by the sensor system, e.g., individuals, trees, buildings, vehicles, and traffic lights, are not detected by the simulated sensor system as a matter of principle, i.e., are not recorded in the interim list of detected virtual objects.

In this description, a "simulation of a sensor system" may mean a simulation based upon a simple sensor system model which merely on the surface imitates the behavior of a sensor system, but at best simulates to a limited degree the physical or technical processes of a physical sensor system and, in particular, does not incorporate any calculation of synthetic image data which, for example, replicates the image data generated by an imaging sensor. Such simple sensor system models are also known as Ground Truth Sensors. An advantage of these is the low computing time that is needed for their execution. Thus, Ground Truth Sensors are particularly suited for use on virtual tests which are executed in strict real time—for example, on Hardware-in-the-Loop methods.

A fundamental problem with implementing Ground Truth Sensors is taking into account a perspectival occlusion of virtual objects detectable by the sensor system. As described earlier, a Ground Truth Sensor initially assesses all virtual objects as detected that are captured by the sensor field and determined to be objects detectable by the sensor system. In order to simulate the sensor system realistically, however, there must be a subsequent check as to whether a virtual object assessed as detected is actually visible to the sensor or whether the virtual object is at least partially obscured from the view of the sensor by another virtual object. If this is the case, and the perspectival occlusion exceeds a certain dimension, the virtual object must be removed from the interim list of detected virtual objects.

Numerous methods for detecting perspectively-occluded surfaces are known from the specialist field of computer graphics. A selection is, for example, disclosed in the presentation, "Visibility and Hidden Surface Removal," by Torsten Möller (part of the lecture, "CMPT 361: Introduction to Computer Graphics," at the Simon Fraser University, Canada, retrievable from the Internet). Some of these also include the projection of a three-dimensional scene onto a projection plane. The aim of this familiar method, however, is the calculation of a realistic image, and its greater computing time makes it problematic for real time applications, the more so as, after calculating a sensor image according to one of the known methods, there should still be an evaluation as to whether a calculated perspectival occlusion would still allow detection of the occluded object by the simulated sensor system.

The article, "Fast Collision Detection Based on Projection Parallel Algorithm," by Xue-li Shen and Tao Li (2nd International Conference on Future Computers and Communication, IEEE, 2010) describes a method for detection of the collision of two bodies in a three-dimensional space by projection on three orthogonal projection planes and carrying out a collision detection on each projection plane.

EP 0 620 409 B1 discloses a simulation environment for the detection and testing of target-seeking rockets. The simulation environment calculates in strict real time a synthetic image for the imaging sensors of a rocket, and the disclosure incorporates a method for detecting surfaces occluded perspectively.

SUMMARY

In an exemplary embodiment, the present invention provides a method for simulating a sensor system. The sensor system includes an imaging sensor and an image-processing unit for recognizing objects in a sensor image output by the sensor. The method includes: assigning location coordinates to the sensor in a virtual test environment comprising a plurality of virtual objects, wherein each virtual object is assigned location coordinates; assigning the sensor a sensor field of view in the virtual test environment; determining a number of objects from the plurality of virtual objects to be virtual objects recognizable by the sensor system; starting a simulation run during which the sensor or at least one virtual object is cyclically assigned new location coordinates in the virtual test environment; cyclically checking whether the at least one virtual object is captured by the sensor field of view; in case a first virtual object and a second virtual object recognizable by the sensor system are captured by the sensor field of view: spanning a projection plane for a perspective projection of the first virtual object and the second virtual object, wherein the projection plane has the location coordinates of the sensor as the center of projection; creating a first image on the projection plane by projecting a first geometric body that is at the same place as the first virtual object, and whose dimensions are at least approximately identical to the dimensions of the first virtual object, in the perspective projection with the location coordinates of the sensor as the center of projection, at least partially onto the projection plane; creating a second image on the projection plane by projecting a second geometric body that is at the same place as the second virtual object, and whose dimensions are at least approximately identical to the dimensions of the second virtual object, in the perspective projection with the location coordinates of the sensor as the center of projection, at least partially onto the projection plane; checking whether an intersection of the first image and the second image exists; and assessing whether or not the second virtual object is perspectively occluded, wherein in case an intersection exists, the Euclidean distance between the sensor and the first virtual object is smaller than the Euclidean distance between the sensor and the second virtual objects, and the size of the intersection exceeds a pre-defined threshold value, the second virtual object is assessed as perspectively occluded, and wherein in case an intersection does not exist, the Euclidean distance between the sensor and the first virtual object is not smaller than the Euclidean distance between the sensor and the second virtual objects, or the size of the intersection exceeds a pre-defined threshold value, the second virtual object is assessed as not perspectively occluded; and creating a signal from the sensor system which indicates that all virtual objects that are captured by the sensor field of view and recognizable by the sensor system, and are assessed as not perspectively occluded, have been recognized by the image-processing unit, and that all virtual objects that are captured by the sensor field of view and recognizable by the sensor system, and are assessed as perspectively occluded, have not been recognized.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIG. 7 depicts examples of scaling of the first or second geometric body.

DETAILED DESCRIPTION

Figure 1:
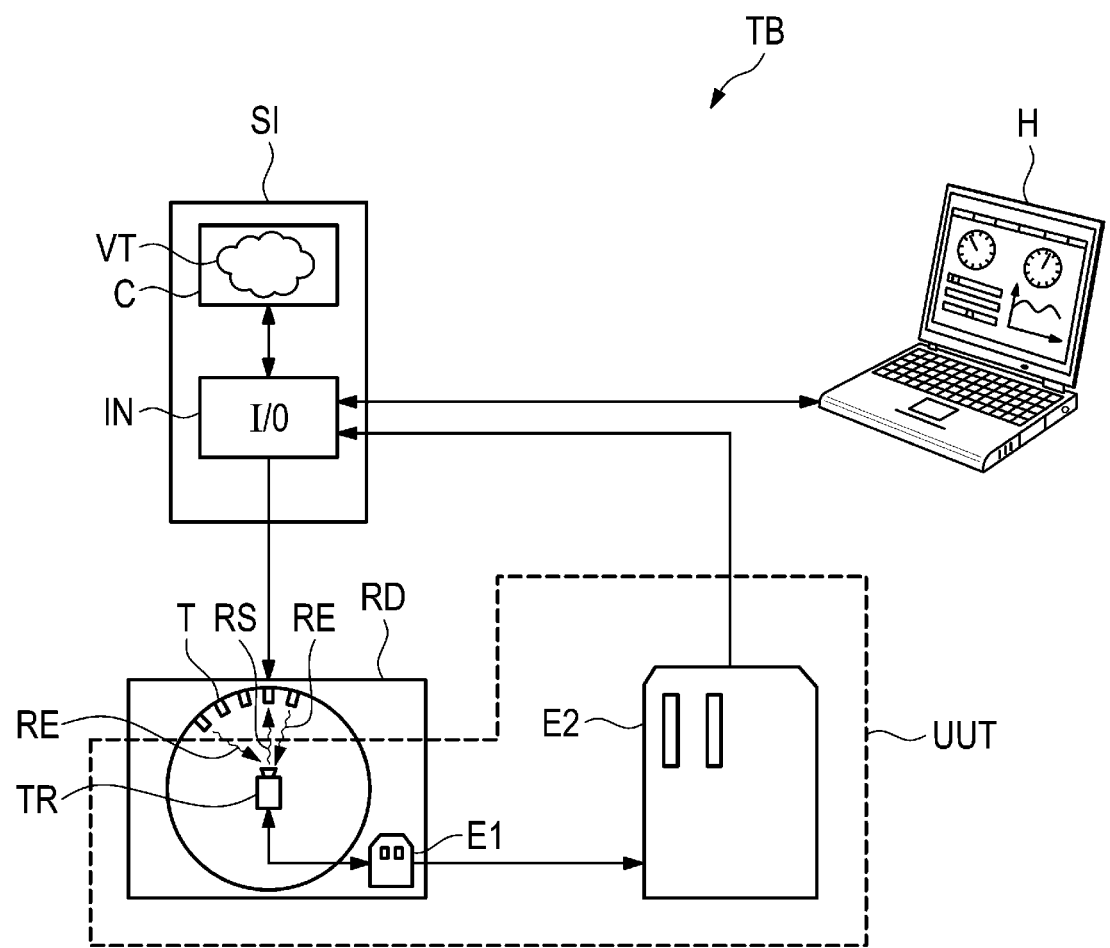
FIG. 1 depicts a computer system set up to execute a method according to the invention.

Exemplary embodiments of the invention speed up the detection of a perspectival occlusion in a simulation of a sensor system with an imaging sensor in a virtual test environment.

In an exemplary embodiment, the simulated sensor system incorporates an imaging sensor and an image-processing unit for detecting objects in the sensor image output by the sensor. The simulation of the sensor system itself may be a Ground Truth Sensor and may implicitly incorporate an imaging sensor and the image-processing unit.

A virtual test environment, which incorporates a multitude of virtual objects and in which location coordinates are assigned to the sensor and to each virtual object respectively, is used. A sensor field of view is assigned to the sensor in the virtual test environment, and a number of objects from the multitude of virtual objects are determined to be virtual objects detectable by the sensor system.

On the virtual test environment, a simulation run is started, in the course of which new location coordinates in the virtual test environment are cyclically assigned to the sensor or at least one virtual object, and a cyclical check is made as to whether at least one virtual object is captured by the sensor field of view.

If at least one first virtual object and a second virtual object are captured by the sensor field of view, and the second virtual object is detectable by the sensor field of view, an estimate of the perspectival occlusion of the second object by the first object is made in the manner described below. For this purpose, in the virtual test environment, initially, a projection plane is spanned, whose spatial orientation is selected so that it is suitable for a perspective projection of the first object and the second object, if the location coordinates of the sensor are used as the center of projection. A perspective projection is to be understood as a projection with a fan-shaped beam path, starting from the center of projection, which generates an image of the projected points as they would be perceived by an observer located at the center of projection—specifically, the sensor.

On the projection plane, an at least partial perspective projection of a geometric body at the same location as the first object is made with the location coordinates of the sensor as the center of projection, wherein the dimensions of the unscaled first geometric body correspond completely or at least approximately to the dimensions of the first object. It is inessential whether the first geometric body is present natively in the virtual test environment or is generated, as required, for producing the perspective projection. With complete correspondence of the dimensions of the first geometric body and the first object, the first geometric body can also be identical to the first object, and thus be present only implicitly in the virtual test environment. Preferably, the first geometric body is a bounding volume or a scaled bounding volume of the first object. A "bounding volume of an object" refers to a geometric body surrounding the object completely, with simplified geometry compared to the surrounded object—for example, a polyhedron with few vertices or a body that can be described analytically in a simple manner—for example, a sphere or a cylinder.

How many vertices a bounding volume should at most comprise or how simple its geometry should be dependent upon the application in question. If the method is intended for execution in real time, the geometry of the geometric body should in principle be selected such that a complete cycle of a software implementation of the method within a time span stipulated by the application in question—in particular, within a simulation time step—is guaranteed so securely that no breach of the stipulated time span by the software implementation is to be expected within a full simulation run. Which geometries of the geometric body or what number of vertices are reasonable is dependent particularly upon the implementation of the method, the complexity of the virtual test environment and the simulation, and upon the hardware equipment of the computer system executing the method.

A "partial perspective projection" or a "partially executed perspective projection" refers to an incomplete selection of points of the object being projected in a perspective projection onto the projection plane. In some embodiments, from the projected points, a set on the projection plane is formed which corresponds approximately to an image resulting from a completely executed perspective projection of the object.

In a manner analogous to the execution of the perspective projection of the first geometric body, an at least partial perspective projection of a second geometric body, at the same location as the second object, onto the projection plane is executed with the location coordinates of the sensor as the center of projection, wherein the dimensions of the unscaled second geometric body correspond completely or at least approximately to the dimensions of the second object.

The projection of the first geometric body generates a first image on the projection plane, and the projection of the second geometric body generates a second image on the projection plane. Thereafter, a check is made as to whether there is an intersection of the first image and the second image. In the event that, first, there is an intersection, second, the Euclidean distance between sensor and first object is less than the Euclidean distance between sensor and second object, and, third, the size of the intersection in relation to the size of the second image exceeds a predefined threshold, the second object is assessed as geometrically occluded, i.e., it is assumed from this that the image-processing unit fails to detect the second object, even if the second object is partially visible from the sensor's viewpoint, because the degree of perspectival occlusion is too high for the image-processing unit to detect the second object. The Euclidean distances are preferably calculated from the location coordinates of the sensor, the first object, and the second object.

A Euclidean distance between the sensor and an object can be calculated from the location coordinates of the sensor and a fixed point on the object—for example, from the point on the object closest to the sensor or the location coordinates of the object.

In the event that at least one of the aforementioned conditions is not met, and therefore that either there is no intersection or the Euclidean distance between sensor and first object is greater than or equal to the Euclidean distance between sensor and second object, or the size of the intersection in relation to the size of the second image does not exceed the predefined threshold, the second object is assessed as not perspectively occluded, i.e., it is assumed that the image-processing unit detects the second object, even if the second object is partially perspectively occluded by the first object, because the degree of perspectival occlusion is sufficiently low for the image-processing unit to detect the second object.

The estimation of a perspectival occlusion described earlier can be performed more than once, if need be, on a number of different virtual objects respectively, if further virtual objects in addition to the first object and the second object are captured by the sensor field of view. For analysis by the specimen or by the computer system running the virtual test environment, a signal is generated by the sensor system, from which the information is deducible that all virtual objects captured by the sensor field of view and detectable by the sensor system which are not assessed as perspectively occluded have been detected by the image-processing unit, and all virtual objects captured by the sensor field of view and detectable by the sensor system which are not assessed as perspectively occluded were not detected by the image-processing unit.

In one possible application case, the signal replicates a possible signal from a real sensor system—in particular, a sensor system produced serially or that is prototypical. In another possible application case, the signal does not replicate a possible signal from a real sensor system and is, for example, used to control a test rig, which is set up to feign the existence of objects to a real image-forming sensor inside its sensor field of view.

One advantage of the invention is that it facilitates a fast and reliable estimate of whether a virtual object can be detected for an image-processing sensor system, without at the same time resorting to laborious methods from the computer graphics field—for example, ray-tracing or Z-buffering. Thus, the method also reduces the hardware overhead for a simulation of a corresponding sensor system, because it can be performed without using a graphics processor (GPU, graphics processing unit). It has been demonstrated that an exemplary software implementation of a method according to the invention can cycle reliably within one millisecond. This means that the invention is suitable for use in a Hardware-in-the-Loop method and that the method according to the invention is real-time capable in the sense of a Hardware-in-the-Loop method.

Advantageously, the sensor is fixed to a virtual automaton in the virtual test environment, in which the signal from the sensor system is monitored by a control system set up to control the virtual automaton or by control software set up to control the virtual automaton. In particular, the control system can be a specimen, e.g., a prototypical embedded system for controlling a physical automaton, which makes decisions about controlling the automaton using a sensor image. Accordingly, the control software can, in particular, be prototypical control software intended for installation on a control system for controlling a physical automaton, or a program logic in development which is intended for later preparation for installation on a corresponding control system. The virtual automaton may be a virtual automated vehicle (a "vehicle" may refer to any technical system set up for continuous movement under its own power). "Fixing the sensor to a virtual automaton" may refer to the location coordinates of the sensor and the spatial orientation of the sensor field of view being stipulated unambiguously by the location coordinates and/or the spatial orientation and/or a state of the virtual automaton.

For further reduction of the computing overhead, it is advantageous not to perform a complete projection of the geometric body on the projection plane, but to project only a selection of points of the geometric body onto the projection plane and, from the cloud of points formed by the images from the selected points, to form a two-dimensional set on the projection plane, corresponding approximately to the image formed by the completely projected geometric body and preferably including all the points in the cloud of points—for example, by forming the convex envelope of the cloud of points. For projection of a polyhedral geometric body, it would, for example, be possible to project all vertices or a selection of vertices of the geometric body. Particularly advantageously, only points of a geometric body are projected whose images are elements of the convex envelope of the image resulting from a complete projection of the geometric body. A numerical method for determining such a selection of points is disclosed in the description of FIGS. 4 through 6.

The convex envelope of a set of points is the smallest convex set which surrounds all points from the set of points. A set is termed convex, if every connecting straight line drawn between two points of the set is contained completely in the set. A body is termed convex, if a set of spatial points congruent with the body is convex.

To check the existence of an intersection and to calculate the size of the intersection in relation to the size of the second image, in an exemplary embodiment of the invention, a known numerical method for measuring areas can be used. For example, the projection plane can be sub-divided into sufficiently small fields—for example, into squares, triangles, or hexagons. The detection of the existence of an intersection and the size comparison with the second image can be done by numbering the fields, which are at least partially inside both the first image and inside the second image, or are at least partially inside the second image, and by comparing the determined field counts.

However, it is advantageous to dispense with a measurement of areas by setting the threshold for the size of the intersection to zero and performing the test for the existence of an intersection using a collision detection of the first image and the second image on the projection plane. In this last-named exemplary embodiment, the bare evidence of the existence of an intersection of the first image and the second image therefore suffices to assess the second virtual body as occluded, assuming that the Euclidean distance of the first virtual object to the sensor is less than the Euclidean distance of the second virtual object to the sensor. The size of the intersection is immaterial. With this, the method is sped up significantly, because the bare evidence of the existence or non-existence of an intersection, with correspondingly more streamlined implementation of the method, uses fewer computing steps than measuring an area.

For collision detection of the first image and the second image, the use of a Gilbert-Johnson-Keerthi algorithm—hereafter, "GJK algorithm"—is advantageous, as described in the specialist article, "The Gilbert-Johnson-Keerthi Distance Algorithm," by Patrick Lindemann (written for the *Media Informatics Proseminar on "Algorithms on Media Informatics,"* 2009).

The first and second images then collide exactly, if their Minkowski difference comprises the origin of a Cartesian coordinate system defined on the projection plane. The GJK algorithm provides for forming the Minkowski difference of the first image and the second image and checking whether the Minkowski difference includes the origin by repeated definition of a triangle in the Minkowski difference, wherein the triangle increasingly approaches the origin in each iteration step. The GJK algorithm is applicable only to convex sets.

For a fast run of the GJK algorithm, it is advantageous if the first image and the second image are convex, closed polygons with few vertices, so that the first image and the second image—and consequently their Minkowski difference—can be sub-divided in each case into a small number of triangles. This can be guaranteed by designing the geometric bodies as convex polyhedra with few vertices, wherein—particularly before executing the projection of a geometric body—a selection of vertices of the geometric body is determined, whose images are elements of the convex envelope of the image of the geometric body. At the same time, only the selection of vertices is projected in each case.

Via a collision detection, e.g., the GJK algorithm, the existence or non-existence of an intersection of the first image and second image is demonstrable. However, in general, a collision detection delivers no information about the size of an existing intersection. If, as in the embodiments of the invention described earlier, the threshold for the size of the intersection is set equal to zero, and a collision detection is used for testing the existence of an intersection, each perspectival occlusion of the second object by the first object acts as an assessment of the second object as perspectively occluded, regardless of the degree of perspectival occlusion.

In some cases, this does not correspond to the behavior of real image-processing sensor systems. In general, therefore, it has to be assumed that a real sensor system, which is set up for identification of objects in a sensor image, detects an object that is detectable for the sensor system, but is perspectively occluded, if the degree of perspectival occlusion does not exceed a certain tolerance value, and that the sensor system does not detect the perspectively-occluded object if the degree of perspectival occlusion exceeds the tolerance value.

In order to emulate this behavior when using a collision detection, it is provided in an exemplary embodiment of the invention that a tolerance value for a perspectival occlusion of an object detectable for the sensor system be determined, a scaling factor be calculated from the tolerance value, and at least the first geometric body or the second geometric body be scaled down by the scaling factor before implementing the projection, or at least the first image or the second image be scaled down by the scaling factor before implementing the collision detection. In the description of FIG. 7, an example of an algorithm for calculating scaling factors is disclosed.

In general—with correspondingly streamlined programming of the projection process or collision detection—it is, in principle, unnecessary to conclude the projection process. For the purpose of speeding up the method according to the invention still further, it is provided, in an exemplary embodiment—even during an ongoing projection process of the first geometric body or the second geometric body—in particular, wherein the projections of the first geometric body and of the second geometric body are executed in parallel—that a collision detection, using the images of the points, already projected onto the projection plane, of the first geometric body and of the second geometric body, be performed, and that the still unconcluded projections be aborted if, based upon the images of points projected previously, a collision is detected or a collision is excluded.

The invention also comprises a computer system set up to execute a method according to the invention and a computer program product for setting up a computer system to execute a method according to the invention.

The diagram in FIG. 1 shows a computer system TB set up as a test rig for a virtual test of a radar-supported control system UUT designed as a driving assistance system. The computer system TB embodies a simulation computer SI, a radar test rig RD, and a host computer H. The simulation computer SI incorporates a processor unit C, on which are stored a real-time operating system and a virtual test environment VT, and an interface unit IN for exchanging data between the virtual test environment VT and the periphery of the simulation computer SI. Stored on the host computer H is a computer program product for setting up the virtual test environment VT and for storing the virtual test environment VT on the processor unit C, as well as operator software for monitoring and controlling the virtual test environment VT on the processor unit C during a simulation run of the virtual test environment VT.

The computer system TB incorporates as a specimen the radar-supported control system UUT with a transmitter-receiver unit TR, a first control device E1, and a second control device E2. The transmitter-receiver unit TR is set up to emit a radar pulse RS, to receive the radar echoes RE of the radar pulse RS via an imaging radar sensor, and to create, using the radar echoes RE, a sensor image of an environment of the transmitter-receiver unit TR. The first control device E1 incorporates an image-processing unit for detecting objects in the sensor image and is also set up to create, based upon the detected objects, a description of the environment of the transmitter-receiver unit TR. The second control device E2 is set up to read in and evaluate the description of the environment, and, using the description of the environment, control a virtual automated vehicle VE in the virtual test environment VT.

The radar test rig RD incorporates a number of radar transmitters T, movable on curves, which are set up to emit radar pulses for simulation of radar echoes RE. The simulation computer SI is set up to control the radar test rig RD. The simulation computer thereby positions the radar transmitter T and coordinates the simulated radar echoes RE time-wise such that the radar test rig RD replicates radar echoes RE from virtual objects in the virtual test environment on a radar pulse emitted by the transmitter-receiver unit TR.

Figure 2:
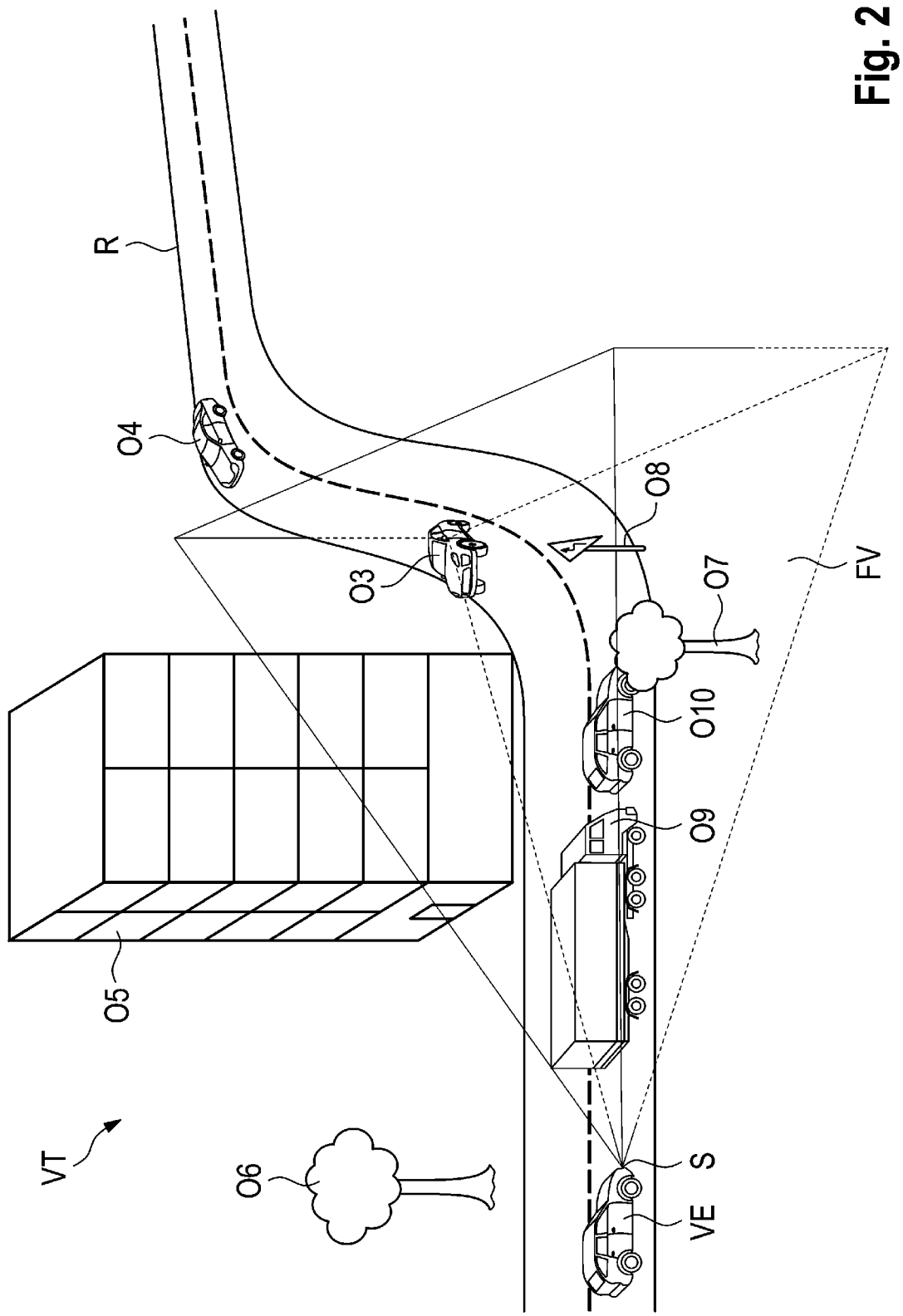
FIG. 2 depicts a virtual test environment stored on the computer system.

The diagram in FIG. 2 shows an example of a moment recording from the virtual test environment VT. The virtual test environment comprises the virtual automated vehicle VE controlled by the second control device E2 on a virtual road R and a multitude of further virtual objects O3, . . . , O10. The virtual objects comprise, for example, vehicles O3, O4, O9, O10, buildings O5, trees O6, O7, and traffic signs O8. Static or changeable location coordinates in the virtual test environment VT are assigned to each virtual object O3, . . . , O10.

A sensor S is fixed to the front of the virtual automated vehicle VE. The sensor S is part of a simulation of a sensor system which, in addition to the sensor S, also incorporates an image-processing unit for identification of objects. A pyramidal sensor field of view FV, starting from the sensor S, is assigned to the sensor S, the spatial orientation of which sensor field of view FV is stipulated by the location coordinates and spatial orientation of the virtual automated vehicle VE. At least one sub-set of the objects present in the virtual test environment VT is determined as objects detectable by the sensor system. All objects O1, . . . , O8, detectable by the sensor system, which are captured by the sensor field of view FV, are recorded in an interim list of detected virtual objects. A check for perspectival occlusion is performed for all objects listed in the interim list, and all objects assessed as perspectivally occluded are removed from the interim list. Objects still listed after completing the checks for perspectival occlusion form a list of detected objects, and the virtual test environment VT generates a signal from the sensor system, from which detected objects in the list are deducible as listed objects.

The precise design of the sensor system signal can differ, depending upon the application. The signal can carry further information about the listed objects, e.g., their location coordinates—absolute, or relative to the sensor S. The signal can, for example, replicate a possible signal from a real sensor system and be fed outside via an interface unit IN for analysis by a control system UUT. In the exemplary embodiment illustrated in FIGS. 1 and 2, the signal does not replicate a signal from a real sensor system and is not fed outside, but is analyzed by the simulation computer SI to control the radar test rig RD.

In the presently described exemplary embodiment, all virtual objects O3, . . . , O10 in the virtual test environment VT are detectable by the sensor system. In other exemplary embodiments, some of the virtual objects present in the virtual test environment VT cannot be recognized by the sensor system. Basically, only objects recognizable by the sensor system are admitted onto the preliminary list of recognizable objects. Advantageously, it is, however, also possible for objects that are not recognizable to the sensor system to perspectively occlude objects that can be recognized by the sensor system.

Each object O1, . . . , O10 has a bounding cuboid B1, B2 assigned as a bounding volume in the virtual test environment VT and which may be referred to as a "bounding box."

The radar test rig RD is to reproduce only radar echoes RE of objects O3, . . . , O10 in the virtual test environment VT that are not perspectivally occluded from the viewpoint of the sensor S, and/or whose perspectival occlusion is below a tolerance value, such that the first control unit E1 would recognize such a perspectivally-occluded physical object as an independent object. In the snapshot depicted in FIG. 2, there are three vehicles O3, O9, O10, a building O5, a tree O7, and a traffic sign O8 captured in the sensor field of view FV and therefore added to the preliminary list of recognized objects. The vehicle O10, however, is perspectively occluded by the vehicle O9, the traffic sign O8 is partially perspectively occluded by the vehicle O9, and the vehicle O3 is partially perspectively occluded by the building O5.

The figures described below illustrate a method according to the invention for estimating perspectival occlusion.

Figure 3:
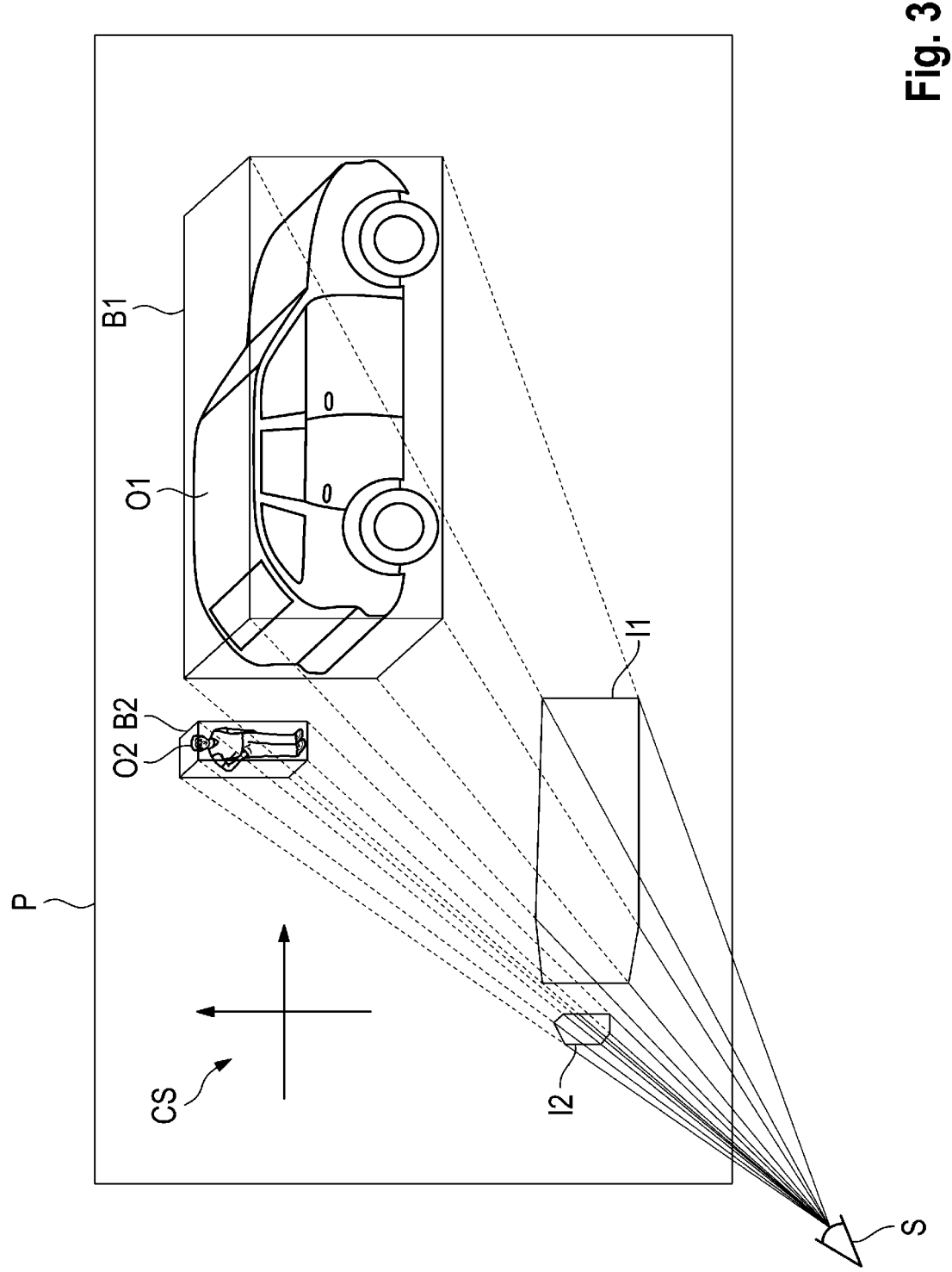
FIG. 3 depicts an example of a projection process for a first geometric body and a second geometric body.

The illustration in FIG. 3 shows a three-dimensional scene in the virtual test environment VT, with the sensor S, a first object O1 in a first bounding box B1, and a second object O2 in a second bounding box B2. The first object O1 and the second object O2 are both captured by the sensor field of view FV and added to the preliminary list of recognized objects. First of all, the location coordinates of the first object O1 and the location coordinates of the sensor S1 are used to determine the Euclidean distance of the first object O1 to the sensor, and, based upon the location coordinates of the second object O2 and the location coordinates of the sensor S, the Euclidean distance of the second object O2 to the sensor is determined. The Euclidean distances are compared, and a perspectival occlusion of the object further away from the sensor S by the object closer to the sensor S is checked from the sensor S viewpoint. There is, for example, a check as to whether the second object O2 is perspectively occluded by the first object O1 from the viewpoint of the sensor S.

For this purpose, a projection plane P is spanned that has a local two-axis coordinate system CS defined on it, and the first bounding box B1 and the second bounding box B2 are at least partially projected onto the projection plane P, wherein a perspective projection with the location coordinates of the sensor S is selected as the center of projection of the projection. Since the bounding boxes B1, B2 are convex bodies, their images I1, I2 on the projection plane are also convex. The projection of the first bounding box B1 occurs in such a way that, before conducting the projection, vertices of the first bounding box B1 are determined, whose images on the projection plane P are the vertices of the first image I1 of the first bounding box B1. A numerical method for determining the respective vertices is disclosed below in the description of FIG. 4. The projection of all six vertices, visible from the viewpoint of the sensor S, of the first bounding box B1 and the creation of the convex envelope of the images of the projected vertices would result in an exact image I1 of the first bounding box B1.

In the same way, a second image I2 of the second bounding box B2 is created on the projection plane P. Instead of bounding cuboids, other bounding volumes with other geometries can be used whose images have, for example, a greater correspondence to the images of the virtual objects enveloped by the bounding volumes.

A collision detection of the first image I1 and the second image I2 is conducted via a GJK algorithm. A collision is present precisely when an intersection of the first image I1 and the second image I2 exists, and the existence of an intersection is assessed as a perspectival occlusion of the second object O2 by the first object O1. The GJK algorithm proposes, first, the generation of the Minkowski difference of the first image I1 and the second image I2 in the local coordinate system CS. The Minkowski difference Σ of two sets A, B is the set, $$\Sigma(A,B)=\{a-b | a \in A, b \in B\},$$

i.e., the set obtained by subtracting each element of B from each element of A. There is an intersection of A and B exactly when the origin is an element of Σ. The GJK algorithm proposes checking whether the origin of the local coordinate system CS is an element of the Minkowski difference Σ of the first image I1 and the second image I2 by segmenting the Minkowski difference Σ into triangles. By using polyhedral bounding volumes for the first object O1 and the second object O2 with just a few vertices, the first image I1 and the second image I2, and, subsequently, also their Minkowski difference Σ, are polygon courses with few vertices, can thus be segmented in a small number of triangles (simplexes). This favors a fast run of the GJK algorithm.

The illustration in FIG. 3 shows a full projection respectively of the first bounding volumes B1 and B2 only to illustrate the projection process. As a matter of fact, it is advantageous that both bounding volumes B1, B2 be projected in parallel, that the Minkowski difference of the already-projected point clouds of the vertices of the two bounding volumes B1, B2 already be generated or partly generated during the projection process, and that the projection process be aborted as soon as a collision of the first image I1 and the second image I2 is recognized or excluded on the basis of the images of the already-projected vertices and/or points. This aspect of the invention is described in more detail in the subsequent descriptions.

Figure 4:
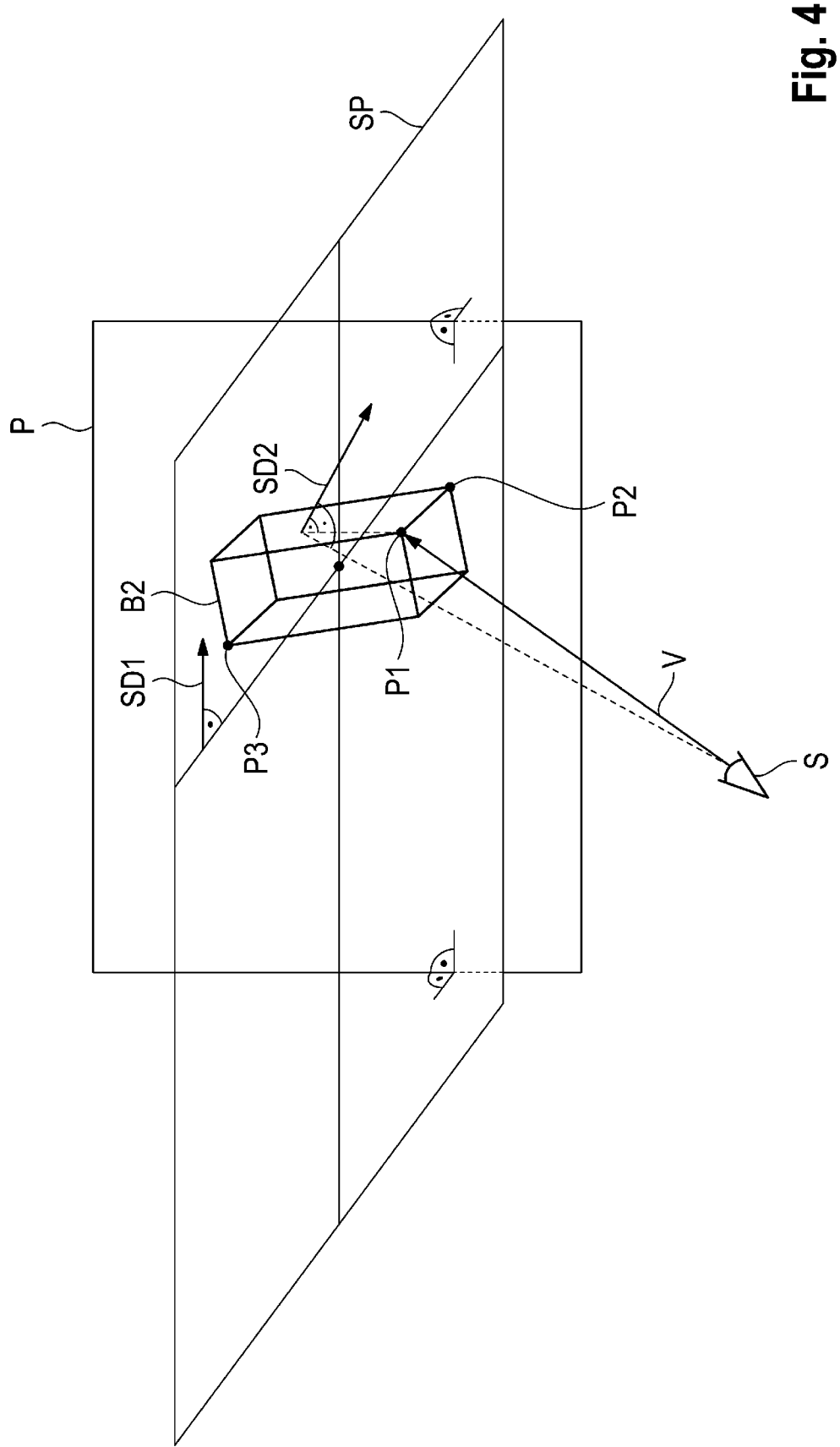
FIG. 4 depicts a method for selecting a point, provided for projection, of a geometric body.

The illustration in FIG. 4 outlines a search algorithm for determining a selection, provided for projection, of points of a bounding volume, using the second bounding box B2 as an example.

Figure 5:
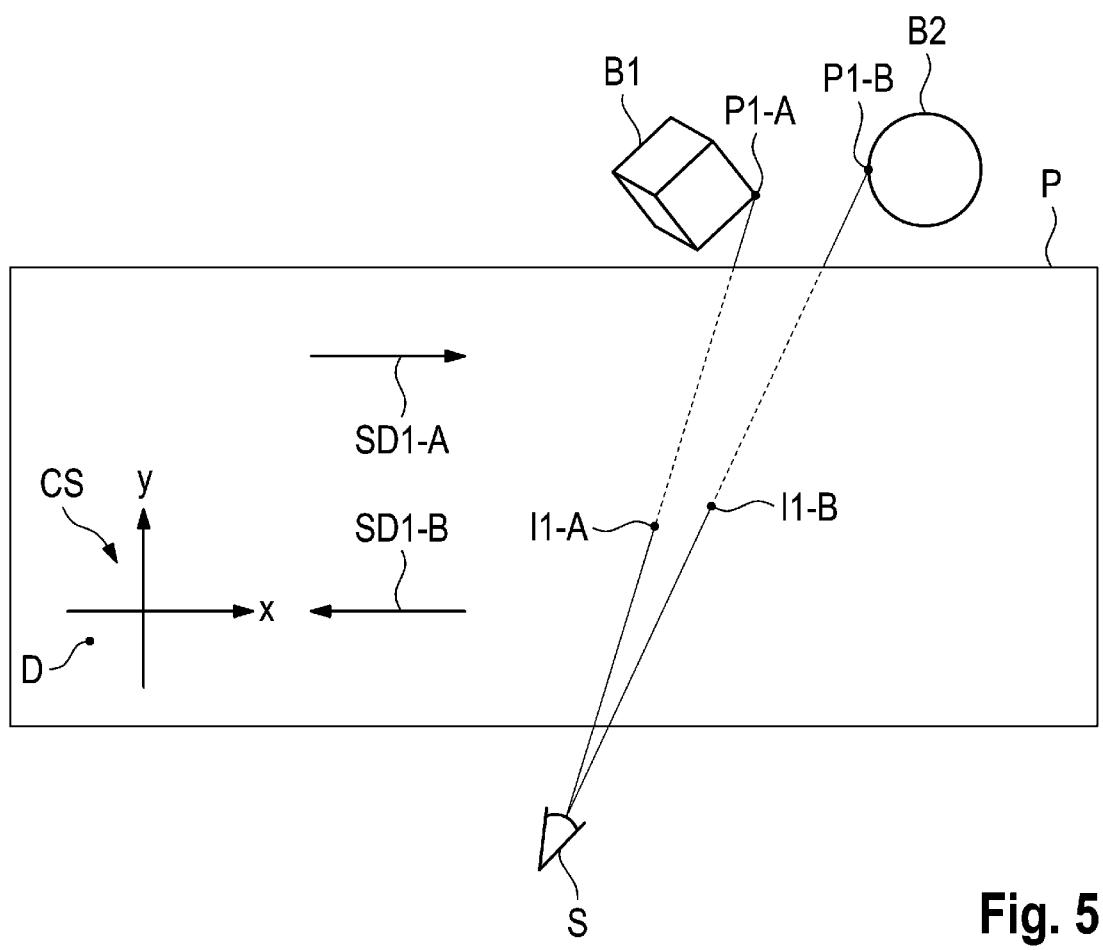
FIG. 5 depicts a first example of aborting a projection process after excluding a collision.
Figure 6:
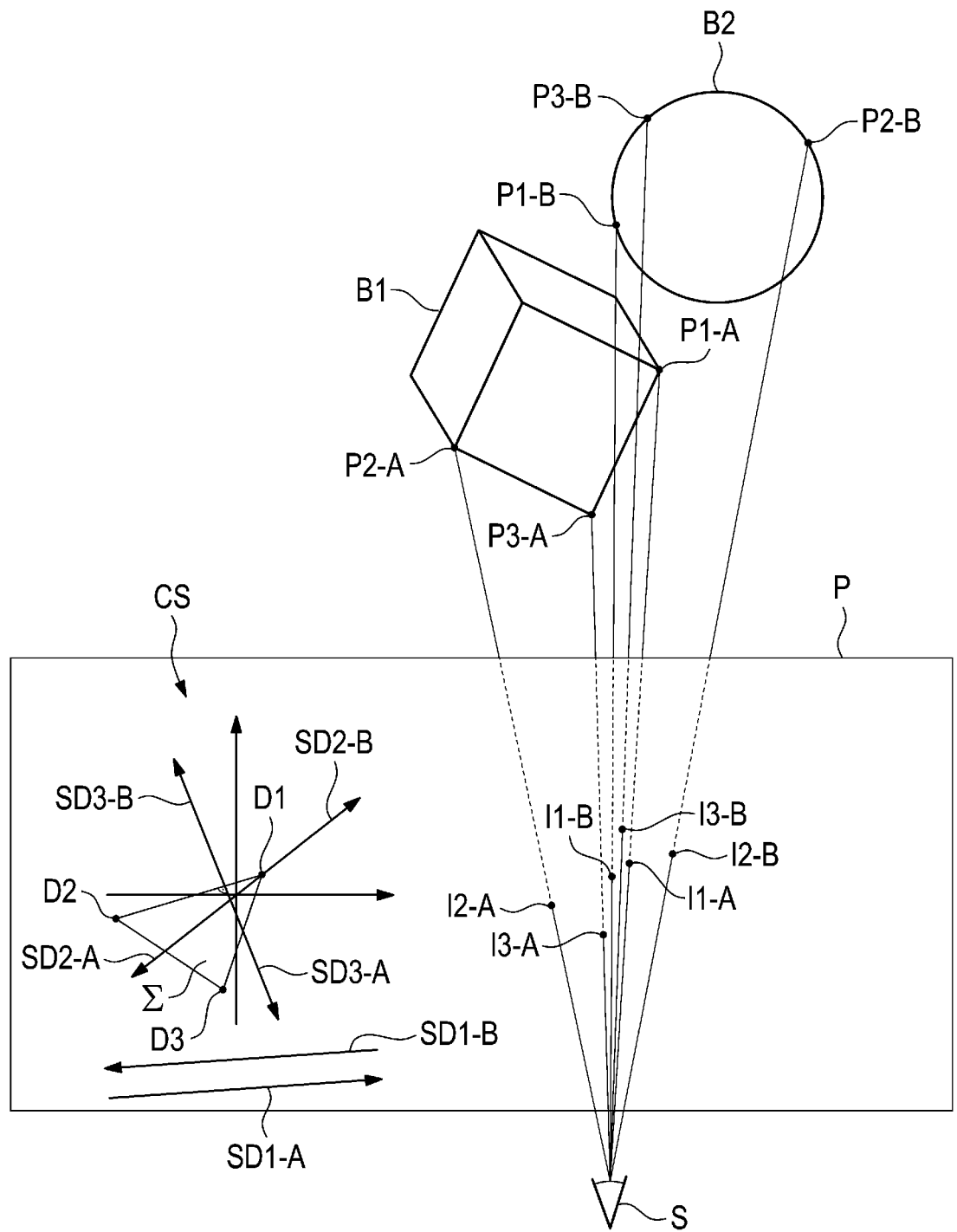
FIG. 6 depicts a second example of aborting a projection process after detecting a collision.

Firstly, an initial search direction SD1 parallel to the projection plane P is determined (rules for selecting the initial search direction are presented in the descriptions of FIGS. 5 and 6), and a search plane SP is spanned on the basis of this initial search direction SD1, fulfilling the following conditions:

the search plane SP is orthogonal to the projection plane P, and the search plane SP is parallel to the search direction SD1.

This search algorithm comprises the following steps:

1) Find a first point P1 of the second bounding box that is furthest out in relation to the search direction SD1.

The first point P1 can, equivalently, also be defined as the point on which a surface whose normal vector is parallel to the search direction SD1 would rest, so that the surface comprises just a single point of intersection with the second bounding box B2 and would no longer have any point of intersection with the second bounding box B2 after an indefinitely small shift in the search direction SD1.

2) Determine the connection vector V from the center of projection, i.e., the location coordinates of the sensor S, to the first point P1.

3) Generate a new search direction SD2 that is parallel to the search plane SP and orthogonal to the connection vector V and whose scalar product with the former search direction SD1 is positive, in order to seek a second point P2 that is furthest out in relation to the new search direction SD2.

4) Repeat steps 1) through 3) until the distance between the point found in the current iteration step and the point found in the previous iteration step falls below a tolerance value.

In the example depicted in FIG. 4, the second point P2 would be determined as the point intended for the projection of the second bounding box B2 on the basis of the search algorithm described. A subsequent search run with an initial search direction that is opposite to the search direction SD1 would determine a third point P3 as the point intended for projection. Basically, the search algorithm can be executed any number of times with changing search directions. Each search run leads to the determination of a boundary point of the second bounding box B2 that is perspectively far out from the viewpoint of the sensor S and would belong to the convex envelope of the image of the second bounding box B2 in case of a full perspective projection of the second bounding box B2 with the location coordinates of the sensor S as the center of projection.

Repeated execution of the search algorithm with different initial search directions determines a selection of points P2, P3 of the second bounding box B2, and the projection of the second bounding box is conducted by projecting the selection of points P2, P3, in a perspective projection with the location coordinates of the sensor S as the center of projection, onto the projection plane P.

As long as the selection of points P2, P3 is sufficiently extensive, the image I2 corresponds exactly to the actual image of the second bounding volume as it would result from a fully-executed perspective projection. The search algorithm can be applied to any bounding volume, including non-polyhedral bounding volumes, e.g., cylindrical bounding volumes, wherein the bounding volumes, advantageously, are convex bounding volumes. By determining a selection of points of a convex bounding volume via the search algorithm, and the creation of a convex set of the images of the selection of points, one can always create an image of the bounding volume that approximately corresponds to the image resulting from a fully-completed projection of the bounding volume.

The determination of a selection of points for projection is conducted in parallel for the first bounding box B1 and the second bounding box B2, and the points determined via the search algorithm are each projected onto the projection plane P directly after being determined. Even while the projection process of the first bounding box B1 and the second bounding box B2 is still continuing, a collision detection is conducted on the projection plane P on the basis of the images of the points that have already been projected, and the projection is aborted if a collision is recognized or excluded on the basis of the images of the already-projected points.

The illustration in FIG. 5 shows a first example of premature termination of a projection of a first bounding volume B1 and a second bounding volume B2. In the example, the first bounding volume B1 is shown as a cube and the second bounding volume B2 as a sphere. First, a first initial search direction SD1-A is determined to find, via the search algorithm illustrated in FIG. 4, the first point P1-A of the first bounding volume B1 that is furthest in the direction of the first initial search direction SD1-A from the viewpoint of the sensor S.

In order to determine the first initial search direction SD1-A, the exemplary embodiment described basically provides for a subtraction of the location coordinates of the first bounding volume B1 from the location coordinates of the second bounding volume B2, and a projection of the connection vector resulting from the subtraction onto the projection plane P.

The first point P1-A is projected, directly after it has been determined, onto the projection plane P, in order to create an image I1-A of the first point. Subsequently, a second initial search direction SD1-B opposite to the initial search direction SD1-A is determined, in order to find the second point P1-B, of the second bounding volume B2, that is furthest, from the viewpoint of the sensor S, in the direction of the second initial search direction SD1-B. The second point P1-B, directly after it has been determined, is projected onto the projection plane P, in order to create an image I1-B of the second point.

Immediately after the projection of the second point P1-B, the difference D of the image of the first point I1-A and the image of the second point I1-B is formed. The difference D is a point of the Minkowski difference Σ of the images of the first bounding volume B1 and the second bounding volume B2. From the negative scalar product of the first initial search direction SD1-A and the difference D, it follows that, since both the first bounding volume B1 and the second bounding volume B2 are convex bodies, the image I1-A of the first point and the image I1-B of the second point are the points closest to one another of the images of the first bounding volume B1 and the second bounding volume B2, and thus the difference D is the point of the Minkowski difference Σ that is closest to the origin of the local coordinate system CS. Consequently, the Minkowski difference Σ cannot comprise the origin of the local coordinate system CS. The projection is therefore aborted after the projection of the first point P1-A and the second point P1-B, and the second object O2 enveloped by the second bounding volume B2 is not assessed as perspectively occluded as long as the second bounding volume B2 is not perspectively occluded by another bounding volume aside from the first bounding volume B1.

The illustration in FIG. 6 shows a second example of a premature termination of a projection and, simultaneously, an advantageous arrangement of the projection process. Basically, the following process steps are provided for recognizing a perspectival occlusion of the second bounding volume B2 by the first bounding volume B1. The selection of a point intended for projection basically occurs, as described for FIG. 4, by using the currently valid initial search direction. In what follows, it is assumed that the Euclidean distance of the second virtual object O2 to the sensor S is greater than the Euclidean distance of the first virtual object O1 to the sensor S.

The process steps are as follows:

1.1) Define a first initial search direction SD1-A by projecting a vector resulting from the subtraction of the location coordinates of the first virtual object O1 from the location coordinates of the second virtual objects O2 onto the projection plane P, and define an initial search direction SD1-B that is opposite to the first initial search direction SD1-A.

1.2) Select a first point P1-A of the first bounding volume B1 on the basis of the first initial search direction SD1-A, and project it onto the projection plane P in order to generate an image I1-A of the first point P1-A of the first bounding volume B1. Select a first point P1-B of the second bounding volume B2 on the basis of the opposite initial search direction SD1-B, and project it onto the projection plane P in order to generate an image I1-B of the first point P1-B of the second bounding volume B2.

1.3) Form a first difference D1 of the images I1-A and I1-B in the local coordinate system CS.

2.1) Define a second initial search direction SD2-A that points in the direction of the origin of the local coordinate system CS starting from the first difference D1, select a second point P2-A of the first bounding volume B1 on the basis of the second initial search direction SD2-A, and project it onto the projection plane P in order to create an image I2-A of the point P2-A.

2.2) Select a second point P2-B of the second bounding volume B2 on the basis of a second initial search direction SD2-B opposite to the initial search direction SD2-A, and project it onto the projection plane P in order to generate an image I2-B of the point P2-B.

2.3) Form a second difference D2 of the latest generated images I2-A and I2-B in the local coordinate system CS.

3.1) Define a third initial search direction SD3-A that is perpendicular to the connection line of the first difference D1 and the second difference and points in the direction of the origin of the local coordinate system CS, select a third point P3-A of the first bounding volume B1 on the basis of the third initial search direction SD3-A, and project it onto the projection plane P in order to create an image I3-A of the third point P3-A of the first bounding volume B1.

3.2) Select a third point P3-B of the second bounding volume B2 on the basis of a search direction SD3-B opposite to the third search direction SD3-A, and project it onto the projection plane P in order to generate an image I3-B of the point P3-B.

3.3) Form a third difference D3 of the latest generated images I3-A and I3-B in the local coordinate system CS.

4) If the simplex of the Minkowski difference Σ spanned from the first difference D1, the second difference D2, and the third difference D3 comprises the origin of the local coordinate system CS, abort the projection process, and assess the second virtual object O2 as perspectively occluded.

5.1) If the simplex does not comprise the origin of the local coordinate system CS, discard the corner point of the simplex that is furthest away from the origin, and define a new initial search direction that is perpendicular to the connection line of the two remaining corner points and points in the direction of the origin of the local coordinate system CS. Select a point of the first bounding volume B1 on the basis of the new search direction, and project it onto the projection plane P in order to generate an image of the point.

5.2) Select a point of the second bounding volume B2 on the basis of a search direction opposite to the new search direction, and project it onto the projection plane P in order to generate an image of the point.

5.3) Form the difference of the two most recently created images in the local coordinate system CS, and use the difference as the new corner point in order to span a new simplex together with the two remaining corner points.

6) Repeat steps 5.1 through 5.3 until either the current simplex comprises the origin of the local coordinate system CS (abort criterion A), or the scalar product of the current initial search direction used to select a point of the first bounding volume B1 and the corner point selected on the basis of the current initial search direction is negative (abort criterion B).

If abort criterion A applies, the second virtual object O2 is assessed as perspectively occluded. If abort criterion B applies, the second virtual object O2 is assessed as not perspectively occluded. The test and application of the abort criterion A naturally become possible only once at least three corner points D1, D2, D3 have been determined. Abort criterion B can be applied already after determination of a single corner point, as described relating to FIG. 5. In the example shown in FIG. 6, the projection process is aborted after determining the third corner point D3 and the second virtual object O2 is assessed as perspectively occluded, since the simplex, spanned by the three corner points D1, D2, D3, of the Minkowski difference Σ comprises the origin of the local coordinate system CS, and thus a partially perspective occlusion of the second bounding volume B2 by the first bounding volume B1 has been proven.

Via the GJK algorithm, the existence of an intersection of two sets can indeed be proven, but the size of the intersection cannot be measured. Accordingly, an indefinitely small perspective occlusion of the second bounding volume B2 by the first bounding volume leads to the second bounding volume B2 being perspectively occluded, and thus assessed as not visible to the sensor system. It is, however, to be expected from a real sensor system with an imaging sensor S and an image-processing unit that the image-processing unit also recognize partially perspectively-occluded objects as such, as long as the perspectival occlusion does not exceed a threshold value.

In order to reproduce this realistic behavior, a tolerance value T for the perspectival occlusion of a virtual object O1, ..., O8 can be defined. A tolerance value of T=0.25 means, for example, that a virtual object found in the sensor field of view FV and recognizable by the sensor system shall be recognized by the sensor system if, from the viewpoint of the sensor S, no more than about a quarter of the surface of the virtual object is perspectively occluded. Depending upon the tolerance value selected, at least the first bounding volume B1 or the second bounding volume B2 is scaled smaller. The second virtual object O2 is assessed as perspectively occluded if an intersection of the images I1, I2 of the scaled bounding volumes exists.

A first scaling factor $s_1$ is introduced for the first bounding volume B1. A second scaling factor $s_2$ is introduced for the second bounding volume B2. For tolerance values in the range of $$0 \leq T \leq 0.5,$$

the scaling factors are determined as follows:

$$s_1 = 1$$

$$s_2 = 2(0.5 - T)$$

For tolerance values in the range of $$0.5 < T \leq 1,$$

the scaling factors are determined as follows:

$$s_1 = 1 - 2\left(\sqrt{\frac{A_2}{A_1}}\right)(T - 0.5)$$

$$s_2 = 0$$

$A_1$ is an exact or estimated value for the area of the first image I1 of the first bounding volume B1, assuming a completely executed projection, and $A_2$ is an exact or estimated value of the area of the second image I2 of the second bounding volume B2. The area $A_1$ of the image of a cuboid-shaped bounding volume is estimated on the basis of the following formula:

$$A_1 = \frac{1}{L^2} \sum_{i=1}^{3} D_i \cdot e_s \cdot e_{n,i}$$

In this, L is the Euclidean distance between the projection plane P and the location coordinates of the virtual object enveloped by the bounding volume; $D_1$, $D_2$, and $D_3$ are three surfaces of the cuboid that are orthogonal to one another; $e_s$ is the difference vector of the location coordinates of the virtual object enveloped by the bounding volume and sensor S; and $e_{n,1}$, $e_{n,2}$, and $e_{n,3}$ are the surface normals.

The illustration in FIG. 7 shows applications of this scaling rule for three different tolerance values. The first bounding volume B1 and the second bounding volume B2 are illustrated in the figure as two-dimensional rectangles with edge lengths of 8 cm×6 cm and 6 cm×4 cm, for the sake of simplicity. Dotted lines represent the unscaled bounding volume, and continuous lines the scaled bounding volume, respectively.

For a tolerance value of T=0.25, the first bounding volume B1 remains unscaled, and there results a scaling factor of 0.5 for the second bounding volume. The first bounding volume B1 has to cover about a quarter of the visible surface of the unscaled, second bounding volume B2 before a perspectival occlusion of the scaled, second bounding volume B2 occurs.

For a tolerance value of T=0.5, the first bounding volume B1 remains unscaled, and the second bounding volume B2 is scaled to point size. The first bounding volume B1 has to cover about half of the visible surface of the unscaled, second bounding volume B2 before a perspectival occlusion of the scaled, second bounding volume B2 occurs.

For a tolerance value of T=1, the resulting scaling factor for the first bounding volume B1 is $s_1$=0.5, and the second bounding volume B2 is scaled to point size. The unscaled, first bounding volume B1 has to approximately fully cover the unscaled, second bounding volume B2 before there is a perspectival occlusion of the scaled, second bounding volume B2 by the scaled, first bounding volume B1.

The scaling process illustrated in FIG. 7 is generally applicable if all the virtual objects O1, . . . , O8 in the virtual test environment VT have similar dimensions. Otherwise, a general application may be problematic. Since the potentially occluded, second bounding volume B2 can be scaled to point size, there may result perspectival occlusion of an arbitrarily small, first bounding volume B1, which is not realistic behavior of a sensor system according to the invention. For example, a process according to the invention in a situation as shown in FIG. 3 may conclude that the vehicle O1 is not visible to the radar-supported control system UUT because it is occluded by the child O2.

In case of dimensions of the virtual objects O1, . . . , O8 in the virtual test environment VT that strongly deviate from one another, it is, therefore, advantageous to conduct a pre-assessment of the plausibility of perspectival occlusion on the basis of the above-described estimates of the surfaces of the images I1, I2. The process may, for example, be expanded in such a way that the test for perspectival occlusion only be conducted if the estimated surface of the first image I1 in relation to the estimated surface of the second image I2 exceeds a given value.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for simulating a sensor system, the sensor system comprising an imaging sensor and an image-processing unit for recognizing objects in a sensor image output by the sensor, wherein the method comprises:
    assigning location coordinates to the sensor in a virtual test environment comprising a plurality of virtual objects, wherein each virtual object is assigned location coordinates;
    assigning the sensor a sensor field of view in the virtual test environment;
    determining a number of objects from the plurality of virtual objects to be virtual objects recognizable by the sensor system;
    starting a simulation run during which the sensor or at least one virtual object is cyclically assigned new location coordinates in the virtual test environment;
    cyclically checking whether the at least one virtual object is captured by the sensor field of view;
    in case a first virtual object and a second virtual object recognizable by the sensor system are captured by the sensor field of view:
        spanning a projection plane for a perspective projection of the first virtual object and the second virtual object, wherein the projection plane has the location coordinates of the sensor as the center of projection;
        creating a first image on the projection plane by projecting a first geometric body that is at the same place as the first virtual object, and whose dimensions are at least approximately identical to the dimensions of the first virtual object, in the perspective projection with the location coordinates of the sensor as the center of projection, at least partially onto the projection plane;
        creating a second image on the projection plane by projecting a second geometric body that is at the same place as the second virtual object, and whose dimensions are at least approximately identical to the dimensions of the second virtual object, in the perspective projection with the location coordinates of the sensor as the center of projection, at least partially onto the projection plane;
        checking whether an intersection of the first image and the second image exists; and
        assessing whether or not the second virtual object is perspectively occluded, wherein in case an intersection exists, the Euclidean distance between the sensor and the first virtual object is smaller than the Euclidean distance between the sensor and the second virtual objects, and the size of the intersection exceeds a pre-defined threshold value, the second virtual object is assessed as perspectively occluded, and wherein in case an intersection does not exist, the Euclidean distance between the sensor and the first virtual object is not smaller than the Euclidean distance between the sensor and the second virtual objects, or the size of the intersection exceeds a pre-defined threshold value, the second virtual object is assessed as not perspectively occluded; and creating a signal from the sensor system which indicates that all virtual objects that are captured by the sensor field of view and recognizable by the sensor system, and are assessed as not perspectivally occluded, have been recognized by the image-processing unit, and that all virtual objects that are captured by the sensor field of view and recognizable by the sensor system, and are assessed as perspectivally occluded, have not been recognized.

2. The method according to claim 1, wherein the sensor is suspended on a virtual automaton in the virtual test environment, and the sensor system signal is monitored by a control system or by control software set up to control the virtual automaton.

3. The method according to claim 1, wherein the first geometric body is a first bounding volume of the first object, and the second geometric body is a second bounding volume of the second object.

4. The method according to claim 1, wherein a selection of points of a geometric body is projected.

5. The method according to claim 4, wherein an image of a geometric body is formed by forming a two-dimensional set from a point cloud on the projection plane formed by images of the selected points.

6. The method according to claim 5, wherein the two-dimensional set is a convex envelope of the point cloud.

7. The method according to claim 4, wherein the selection of points consists of points whose images are elements of a convex envelope of an image of a geometric body resulting from a full projection of the geometric body.

8. The method according to claim 1, wherein a collision detection is conducted for the first image and the second image to test the existence of an intersection, and the threshold value of the size of the intersection equals zero.

9. The method according to claim 8, wherein a Gilbert-Johnson-Keerthi algorithm is used for the collision detection.

10. The method according to claim 8, wherein a tolerance value is determined for a perspectival occlusion of a virtual object recognizable to the sensor system, a scaling factor is calculated from the tolerance value, and the first geometric body or the second geometric body is scaled smaller by the scaling factor before conducting the projection.

11. The method according to claim 8, wherein a tolerance value is determined for a perspectival occlusion of a virtual object recognizable to the sensor system, a scaling factor is calculated from the tolerance value, and the first image or the second image is scaled smaller before conducting the collision detection.

12. The method according to claim 8, wherein, during the execution of the projection of the first geometric body or the second geometric body, a collision detection is conducted based upon images of points of the first geometric body and of the second geometric body already projected onto the projection plane, and the as yet incomplete projections are aborted in response to a collision being detected or a collision being excluded based on the images of the already-projected points.

13. The method according to claim 1, wherein the Euclidean distances of the first geometric body and the second geometric body to the sensor are determined.

14. A computer system, comprising:
a host computer;
a simulation computer; and
a test rig;
wherein the host computer, the simulation computer, and the test rig are configured to simulate a sensor system, the sensor system comprising an imaging sensor and an image-processing unit for recognizing objects in a sensor image output by the sensor, wherein simulating the sensor system comprises:
assigning location coordinates to the sensor in a virtual test environment comprising a plurality of virtual objects, wherein each virtual object is assigned location coordinates;
assigning the sensor a sensor field of view in the virtual test environment;
determining a number of objects from the plurality of virtual objects to be virtual objects recognizable by the sensor system;
starting a simulation run during which the sensor or at least one virtual object is cyclically assigned new location coordinates in the virtual test environment;
cyclically checking whether the at least one virtual object is captured by the sensor field of view;
in case a first virtual object and a second virtual object recognizable by the sensor system are captured by the sensor field of view:
spanning a projection plane for a perspective projection of the first virtual object and the second virtual object, wherein the projection plane has the location coordinates of the sensor as the center of projection;
creating a first image on the projection plane by projecting a first geometric body that is at the same place as the first virtual object, and whose dimensions are at least approximately identical to the dimensions of the first virtual object, in the perspective projection with the location coordinates of the sensor as the center of projection, at least partially onto the projection plane;
creating a second image on the projection plane by projecting a second geometric body that is at the same place as the second virtual object, and whose dimensions are at least approximately identical to the dimensions of the second virtual object, in the perspective projection with the location coordinates of the sensor as the center of projection, at least partially onto the projection plane;
checking whether an intersection of the first image and the second image exists; and
assessing whether or not the second virtual object is perspectivally occluded, wherein in case an intersection exists, the Euclidean distance between the sensor and the first virtual object is smaller than the Euclidean distance between the sensor and the second virtual objects, and the size of the intersection exceeds a pre-defined threshold value, the second virtual object is assessed as perspectivally occluded, and wherein in case an intersection does not exist, the Euclidean distance between the sensor and the first virtual object is not smaller than the Euclidean distance between the sensor and the second virtual objects, or the size of the intersection exceeds a pre-defined threshold value, the second virtual object is assessed as not perspectivally occluded; and
creating a signal from the sensor system which indicates that all virtual objects that are captured by the sensor field of view and recognizable by the sensor system, and are assessed as not perspectivally occluded, have been recognized by the image-processing unit, and that all virtual objects that are captured by the sensor field of view and recognizable by the sensor system, and are assessed as perspectivally occluded, have not been recognized.

15. One or more non-transitory computer-readable media having processor-executable instructions stored thereon for simulating a sensor system, the sensor system comprising an imaging sensor and an image-processing unit for recognizing objects in a sensor image output by the sensor, wherein the processor-executable instructions, when executed, facilitate:

assigning location coordinates to the sensor in a virtual test environment comprising a plurality of virtual objects, wherein each virtual object is assigned location coordinates;

assigning the sensor a sensor field of view in the virtual test environment;

determining a number of objects from the plurality of virtual objects to be virtual objects recognizable by the sensor system;

starting a simulation run during which the sensor or at least one virtual object is cyclically assigned new location coordinates in the virtual test environment;

cyclically checking whether the at least one virtual object is captured by the sensor field of view;

in case a first virtual object and a second virtual object recognizable by the sensor system are captured by the sensor field of view:

spanning a projection plane for a perspective projection of the first virtual object and the second virtual object, wherein the projection plane has the location coordinates of the sensor as the center of projection;

creating a first image on the projection plane by projecting a first geometric body that is at the same place as the first virtual object, and whose dimensions are at least approximately identical to the dimensions of the first virtual object, in the perspective projection with the location coordinates of the sensor as the center of projection, at least partially onto the projection plane;

creating a second image on the projection plane by projecting a second geometric body that is at the same place as the second virtual object, and whose dimensions are at least approximately identical to the dimensions of the second virtual object, in the perspective projection with the location coordinates of the sensor as the center of projection, at least partially onto the projection plane;

checking whether an intersection of the first image and the second image exists; and assessing whether or not the second virtual object is perspectively occluded, wherein in case an intersection exists, the Euclidean distance between the sensor and the first virtual object is smaller than the Euclidean distance between the sensor and the second virtual objects, and the size of the intersection exceeds a pre-defined threshold value, the second virtual object is assessed as perspectively occluded, and wherein in case an intersection does not exist, the Euclidean distance between the sensor and the first virtual object is not smaller than the Euclidean distance between the sensor and the second virtual objects, or the size of the intersection exceeds a pre-defined threshold value, the second virtual object is assessed as not perspectively occluded; and creating a signal from the sensor system which indicates that all virtual objects that are captured by the sensor field of view and recognizable by the sensor system, and are assessed as not perspectively occluded, have been recognized by the image-processing unit, and that all virtual objects that are captured by the sensor field of view and recognizable by the sensor system, and are assessed as perspectively occluded, have not been recognized.

* * * * *